No. 740,718. PATENTED OCT. 6, 1903.
E. WALKER.
ICE CREAM STORAGE TANK.
APPLICATION FILED APR. 25, 1903.
NO MODEL. 2 SHEETS—SHEET 1.

Witnesses
E. Walker, Inventor
Attorneys

No. 740,718. PATENTED OCT. 6, 1903.
E. WALKER.
ICE CREAM STORAGE TANK.
APPLICATION FILED APR. 25, 1903.
NO MODEL. 2 SHEETS—SHEET 2.
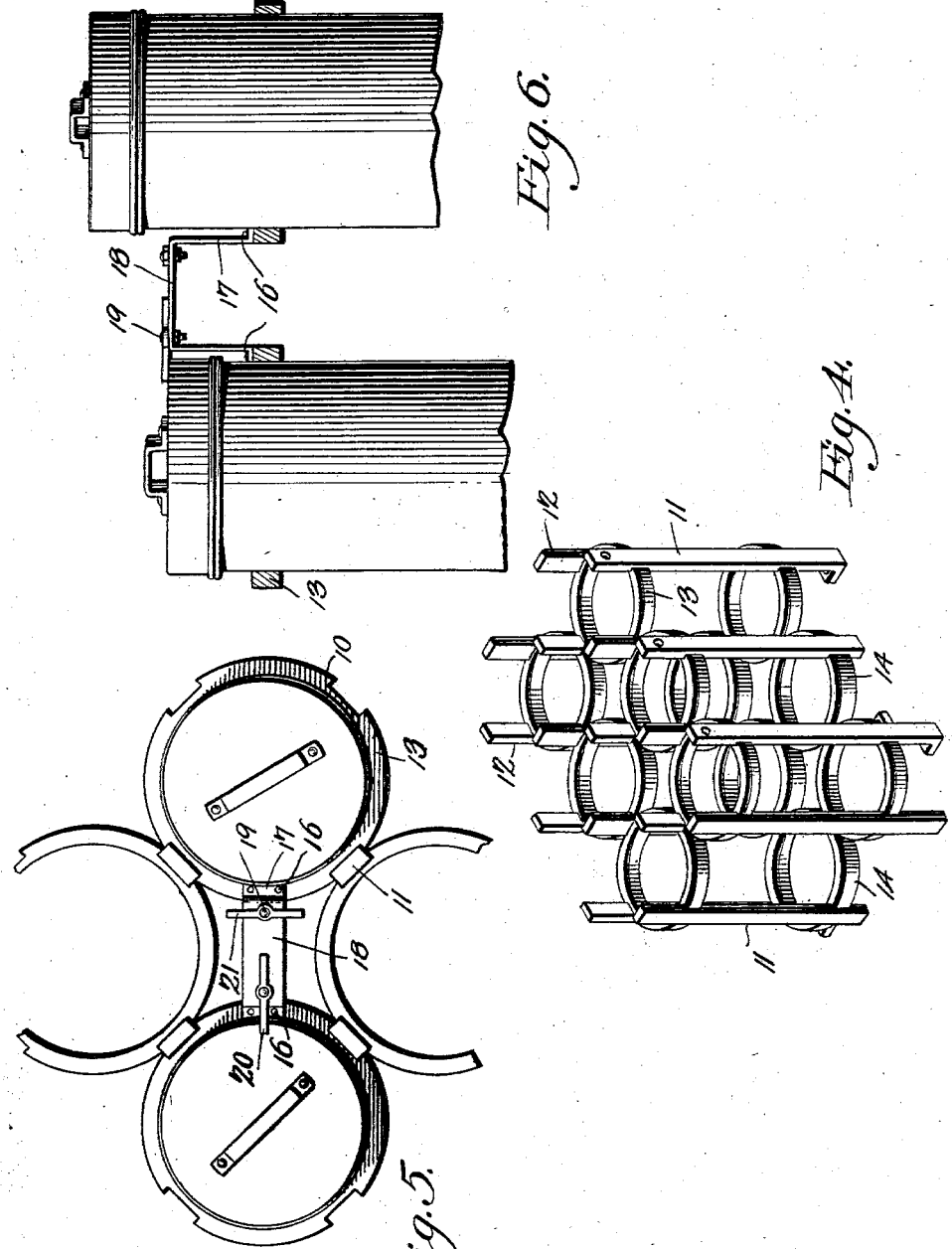

No. 740,718.

Patented October 6, 1903.

UNITED STATES PATENT OFFICE.

EDWARD WALKER, OF WARREN, PENNSYLVANIA.

ICE-CREAM-STORAGE TANK.

SPECIFICATION forming part of Letters Patent No. 740,718, dated October 6, 1903.

Application filed April 25, 1903. Serial No. 154,328. (No model.)

*To all whom it may concern:*

Be it known that I, EDWARD WALKER, a citizen of the United States, residing at Warren, in the county of Warren and State of Pennsylvania, have invented a new and useful Improvement in Ice-Cream-Storage Tanks, of which the following is a specification.

My invention relates to storage-tanks for ice-cream freezers, and has for its objects to produce a device of this character which will be simple of construction, efficient in operation, one in which a cooling medium will be circulated through the tank around the contained freezers and one in which the freezers will be locked to hold them down in the cooling liquid.

With these and other objects in view the invention comprises the novel details of construction and combination of parts, more fully hereinafter described.

Figure 1:
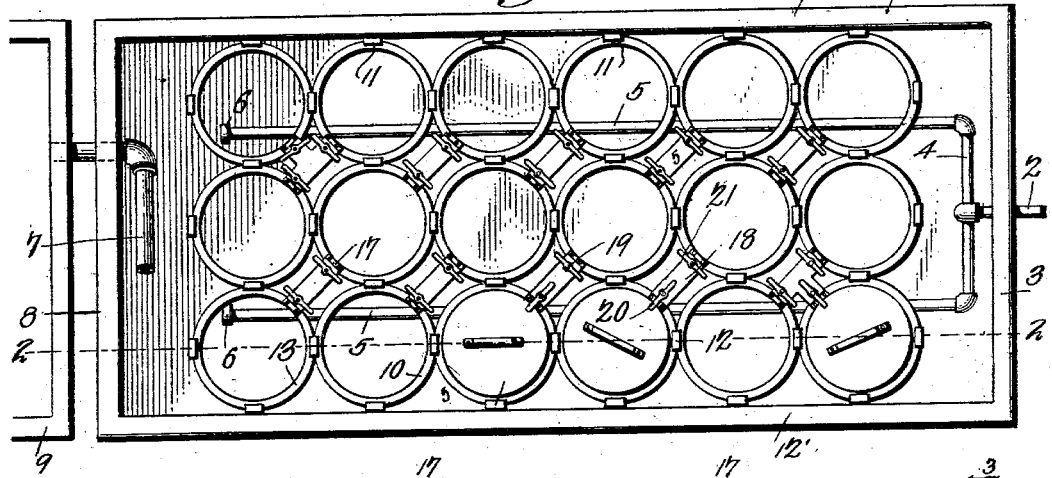
Figure 2:
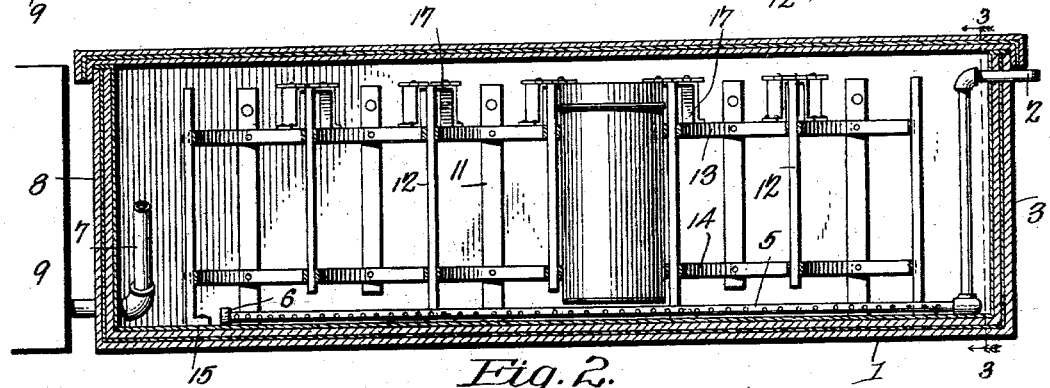
Figure 3:
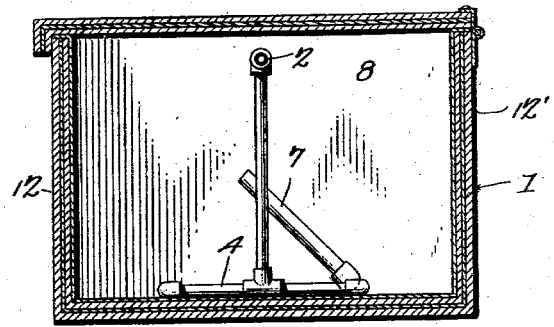

In the accompanying drawings, Figure 1 is a top plan view of a tank constructed in accordance with my invention and having its cover removed to expose the internal mechanism to view. Fig. 2 is a vertical longitudinal sectional elevation of the same on the line 2 2 of Fig. 1 with the tank-cover in position. Fig. 3 is a transverse sectional elevation on the line 3 3 of Fig. 1 as viewed in the direction of the arrow. Fig. 4 is a perspective view of the freezer-sustaining frame removed from the tank. Fig. 5 is an enlarged detail view in plan of the can-locking device. Fig. 6 is a similar view of said part in sectional elevation.

Referring to the drawings, 1 indicates a tank, preferably rectangular in form and of galvanized iron, though the same may be of any suitable material and of any suitable or desired shape.

2 is an inlet-pipe which enters the end wall 3 of the tank adjacent to its top and extends downward to a point near the bottom of the tank, where it connects by transverse branches 4 with longitudinal distributer-pipes 5. These latter pipes, which extend in parallel relation along the bottom of the tank and substantially from end to end thereof, have their free ends closed by caps 6 and their walls perforated to permit of the liquid flowing freely through them and being delivered into the tank. Attention is here directed to the fact that any suitable cooling medium may be employed; but I prefer to employ calcium or salt brine, which is maintained in constant circulation in the tank by means of a pump or other suitable apparatus such as is common in maintaining the circulation in cold-storage pipes in connection with mechanical refrigeration.

7 indicates a discharge or stand pipe which is situated within the tank 1 and extends outward therefrom near the bottom of end wall 8. This pipe 7, which constitutes an overflow or discharge pipe for the brine contained in the tank, is pivotally associated with the wall of the tank and is adapted to swing in a vertical plane from an erect to any desired inclination, as illustrated more particularly in Fig. 3, to regulate the height of the brine within the tank, as will be readily understood. The brine which passes off from the tank 1 through the pipe 7 is delivered into a surplus brine-receiving tank, a portion of which is indicated at 9 and which is situated adjacent to the pumping mechanism. (Not shown.) The sides, ends, and bottom of tank 1 are suitably insulated by an outer covering or casing of wood, which is made up of two thicknesses of lumber, having an interposed layer of insulating-paper; but the tank may be insulated in any other suitable or desired manner.

This tank, which is employed for storing or packing ice-cream freezers to allow of the hardening or final freezing of the cream prior to shipment, is provided upon its interior with a can receiving and holding frame 10, now to be described.

11 indicates vertical standards of galvanized strap-iron, cast-iron, or other suitable material, which are secured by screws or otherwise to the side walls 12 of the tank 1, upon the interior of the same. These standards serve in conjunction with inner vertical standards 12 to sustain upper and lower can-receiving rings 13 14, respectively, which are arranged in pairs in vertical alinement, as shown in Fig. 2, and are riveted or otherwise secured to the standards for connecting the same, while the standards in turn serve to sustain the rings, as before stated. These rings and standards conjointly compose the can-receiving frame 10, which is situated in the tank and which, aside from the standards 11 being secured to the walls of the tank, is further attached to the latter by extending alternate ones of the inner standards 12 downward to the bottom of the tank and bending the lower ends of the same at right angles to form shoes, which are riveted or otherwise secured to the tank-bottom, as at 15, while the remaining standards terminate at their lower ends short of the tank-bottom, as clearly shown in Fig. 2. The rings 13 and 14, which receive the tank, are so positioned or spaced vertically that the upper rings 13 will encircle the can near its top, while the lower ring 14 will similarly embrace the can near its bottom, thus serving to firmly sustain the cans and prevent them from becoming accidentally displaced or turned over within the tank, as will be readily understood.

In order that the cans of ice-cream may be held in the frame to maintain them properly submerged in the brine during the freezing process, I bolt or otherwise secure to the upper faces of the upper rings 13, as at 16, and between every pair of cans a U-shaped frame 17, which is of a height sufficient for its upper horizontal portion or crown 18 to extend in horizontal alinement with the tops of the cans when in position in the frame 10, as clearly shown in Fig. 6. To each of the frames 17 I pivot, each upon a vertical bolt 19, a pair of latches or cleats 20 21, which are operable for engagement with the tops of the respective cans of the pair. By this means the cans when once pressed down into the brine and engaged by the cleats are maintained in the properly-submerged condition, and their accidental rising is entirely precluded.

In practice the cooling medium, as above described, will be delivered into the tank through the inlet-pipe 2 and the distributing-pipes 5, and the surplus will be discharged from the tank through pipe 7. The cans containing the cream to be hardened will be seated in position within the receiving-rings of the frame 10 and pressed down into the brine and locked by the cleats 20 21, as above explained. When the cans are in position in the frame, their lower ends will terminate short of the tank a suitable distance to permit of the brine flowing freely beneath them, and at the same time the cans will be properly spaced one from the other to permit of the brine flowing between them and reaching their outer walls at all points, thus thoroughly preserving the cream and quickly hardening the same, as will be understood.

From the foregoing it will be seen that I produce a device which is simple of construction and at the same time is strong and durable and one which in practice will efficiently perform its functions, and in attaining these ends it is to be understood that I do not limit myself to the precise details herein shown and described, inasmuch as minor changes may be made in the form, proportions, and manner of assemblage of the parts without departing from the spirit of my invention.

Having thus described my invention, what I claim is—

1. In a device of the class described, the combination with a tank, of means for circulating a cooling medium therethrough, a can-sustaining frame situated within the tank and comprising vertical standards and can-receiving rings connected thereto, and means for locking the cans in the frame, said means comprising a U-shaped member attached to the receiving-rings and cleats pivoted to the member and operable for engagement with the can.

2. In a device of the class described, the combination with a tank, of means for circulating a cooling medium therethrough, a can-sustaining frame situated within the tank and comprising vertical standards and upper and lower vertically-alined spaced can-receiving rings attached to the standards, and means for locking the cans in the frame, said means comprising a U-shaped member attached to the upper receiving-rings and cleats pivoted to the member and operable for engagement with the can.

In testimony that I claim the foregoing as my own I have hereto affixed my signature in the presence of two witnesses.

EDWARD WALKER.

Witnesses:
FRED N. COOK,
JEROME L. COGSWELL.